Patented Mar. 29, 1938 2,112,507

UNITED STATES PATENT OFFICE 2,112,507

PROCESS OF PRODUCING VACCINE LYMPH

Kishiro Sukegawa, Koishikawa-ku, Tokyo, Japan

No Drawing. Application June 29, 1935, Serial No. 29,175. In Japan December 28, 1933

5 Claims. (Cl. 167—78)

This invention relates to a process of producing vaccine lymph, and consists in adding to meat juice a suitable decomposed albumin, e. g. pepton or amino-acid, and salt and sugar, neutralizing it with colloidsol of sodium silicate or alkali-carbonate, adding hormone thereto, next adding active elements of bird's ovum obtained during the process of its hatching, thereby obtaining a cultural media, and then transmitting and cultivating the virus of smallpox in said cultural medium.

The object of the invention is to cultivate the virus of smallpox by feeding them artificially, without relying upon the animal body as in the process heretofore practised, thereby obtaining, in a simple and economical manner, the virus of smallpox necessary for the vaccination into the human body, whose reaction upon the skin is mild when inoculated upon the human body and whose protective power keeps long potent.

According to this invention, the liquid of meat juice is first added with a suitable decomposed albumin (e. g. pepton or amino-acid), salt and sugar such as grape-sugar or milk-sugar. The mixture is neutralized by adding thereto colloidsol of sodium silicate or alkali-carbonate. Then, to said neutralized liquid is added some sort of hormone body, e. g. such as pituitary body, or thyroid gland of hormone, or some chemical compound which has the equivalent effect, and thereto is also added the efficacious element of bird's ovum obtained on the third day or on any day up to the twelfth day during the process of its hatching (e. g. in the case of a hen's egg, embryonic ectoblast tissue and plasma of the choroid urethral membrane, or an extract thereof), thereby obtaining a liquid or solid cultural medium. Then, the virus of smallpox, namely the vaccine lymph separated from miscellaneous germs (the vaccine lymph established according to the present regulation, or retrovaccination cow lymph established similarly) is transplanted and cultivated in the cultural media prepared in the manner mentioned above.

An example of the mode of carrying out this invention is as follows:—

To 100 parts of meat juice, there are added from 10 to 15 parts of the decomposed albumin, e. g. pepton or amino-acid, from 5 to 7 parts of salt, and from 30 to 300 parts of grape sugar successively. Said liquid is then neutralized by adding from 0.1 to 0.2 part of colloidsol of sodium silicate. Then the same is admixed with the active element of suprarenal capsule, e. g. 5 parts of 1000 fold solution of adrenalin, and a small quantity of the active elements of the ovum, i. e. embryonic ectoblast tissue, and plasma of the choroid urethral membrane obtained on the 8th day during the incubative process of a hen's egg. Then the legal vaccine lymph is transplanted and cultivated in the culture media thus prepared for 10 days in the incubator at 37° C. Then the product is filtered, and thereto is added 0.5% glycerinum of carbolic acid, thereby producing the pure, sterilized vaccine lymph.

In carrying out my process, I may use amino-acid in place of pepton, milk-sugar in place of grape-sugar, egg of duck or quail in place of egg of hen, hormone of thyroid-gland or hypophysis in place of adrenalin, sodium silicate, with the same satisfactory result. I may also use a solid culture media, which is made by adding Japanese gelatine to the above mentioned liquid nutriment.

A historical record of the methods of producing the vaccine lymph is as follows:—

(A) VARIOLATION

This method was prevalent in India and China in ancient times and consists in inoculating the toxin of smallpox directly upon the human body. But this method often provokes actual case.

(B) VACCINATION

This is known as "Jenner's method", for which the following four kinds of virus of smallpox are in use:

(1) *Humanized vaccine*

This is a matter taken from the vesicle produced by inoculating the germs of smallpox of a cow upon the human body. But the use of this kind of vaccine has been abolished since 1864, for fear of spreading such infectious diseases as syphilis, tuberculosis, skin diseases.

(2) *Original vaccine*

This is a matter taken from the vesicle produced naturally on the cow's teat. But it is inconvenient inasmuch as this kind of vaccine is not always available.

(3) *Revaccinated vaccine*

This is a matter taken from the vesicle produced by revaccinating humanized vaccine upon the body of a calf.

(4) *Animal vaccine*

This is a matter taken from the vesicle produced by inoculating the original cow lymph upon the body of another calf.

Among the above-mentioned, (B), (2) and (4)

are both improvements upon Jenner's method and it is the revaccinated vaccine that is used in every country at present.

But all these cow lymphs have severe reaction when they are inoculated upon the human body. In order to avoid such a defect, sometimes the rabbit is used as material.

And although in common use, vaccines which are produced upon the body of the calf are mingled with various kinds of germs and contain such animal organizations as the spore, lymph or scab of the calf, causing severe secondary reactions when inoculated upon the human body.

As for the miscellaneous bacteria mixed in the virus of smallpox, it has been proposed heretofore to sterilize them, mixing 1 part of vaccine lymph with 3 parts of 80% water solution of glycerine, and storing it in a refrigerator for a period of one or two months. It has been also proposed to add from 0.6 to 0.8% of carbolic acid to the glycerinated virus for the same purpose. But I have found that all the above-mentioned existing methods were unable to make the virus perfectly nonbacilli.

Contrary to any of the old processes which rely upon vital body such as animal body in cultivating the virus, according to this invention the virus of smallpox is transplanted and cultivated upon the artificial nutriment media, so that it is possible to easily and economically produce the virus pure from any other germs, which can make the human body immune with very slight reaction on the skin after the inoculation.

The vaccine, prepared according to the present invention, has been successfully subjected to a large number of experimental tests, using both animal and human subjects, and thus verifying the development of the virus of smallpox in the culture media of the invention, a positive result having been obtained in every case. In making these tests, hypodermic inoculation was employed. However, the vaccine of the present invention may also be used with the cutting method or by injection. The utility of the invention is evident from the foregoing.

What I claim is:—

1. A process for the production of vaccine lymph comprising adding an aminoacid-containing substance, salt and sugar to meat juice, neutralizing the product with a member of the group consisting of the colloidsols of sodium silicate and sodium carbonate, adding adrenalin thereto, then adding the active elements of a bird's ovum consisting of embryonic ectoblast tissue and plasma of the urethral membrane obtained during the process of its hatching, thereby obtaining a cultural medium, and then transplanting and cultivating the virus of smallpox in said cultural medium.

2. A process for the production of vaccine lymph comprising adding peptone, salt and sugar to meat juice, neutralizing the product with colloidsol of sodium silicate, adding adrenalin thereto, then adding the active elements of a bird's ovum consisting of embryonic ectoblast tissue and plasma of the urethral membrane obtained during the process of its hatching, thereby obtaining a cultural medium, and then transplanting and cultivating the virus of smallpox in said cultural medium.

3. A process for the production of vaccine lymph comprising adding peptone, salt and sugar to meat juice, neutralizing the product with colloidsol of alkali carbonate, adding adrenalin thereto, then adding the active elements of a bird's ovum consisting of embryonic ectoblast tissue and plasma of the urethral membrane obtained during the process of its hatching, thereby obtaining a cultural medium, and then transplanting and cultivating the virus of small pox in said cultural medium.

4. A process for the production of vaccine lymph comprising adding aminoacid, salt and sugar to meat juice, neutralizing the product with colloidsol of sodium silicate, adding adrenalin thereto, then adding the active elements of a bird's ovum consisting of embryonic ectoblast tissue and plasma of the urethral membrane obtained during the process of its hatching, thereby obtaining a cultural medium, and then transplanting and cultivating the virus of smallpox in said cultural medium.

5. A process for the production of vaccine lymph comprising adding aminoacid, salt and sugar to meat juice, neutralizing the product with colloidsol of alkali carbonate, adding adrenalin thereto, then adding the active elements of a bird's ovum consisting of embryonic ectoblast tissue and plasma of the urethral membrane obtained during the process of its hatching, thereby obtaining a cultural medium, and then transplanting and cultivating the virus of smallpox in said cultural medium.

KISHIRO SUKEGAWA.